United States Patent [19]

Ebi et al.

[11] Patent Number: 4,504,844

[45] Date of Patent: Mar. 12, 1985

[54] INK JET PRINTING APPARATUS

[75] Inventors: Yutaka Ebi, Kawasaki; Tadashi Fujii; Takuro Sekiya, both of Yokohama; Masanori Horike, Tokyo; Tatsuya Furukawa, Yokohama; Masaaki Tachiki, Tokyo, all of Japan

[73] Assignee: Ricoh Company, Ltd., Tokyo, Japan

[21] Appl. No.: 433,929

[22] Filed: Oct. 12, 1982

[30] Foreign Application Priority Data

Oct. 20, 1981 [JP] Japan ............................... 56-167689

[51] Int. Cl.³ ............................................ G01D 15/16

[52] U.S. Cl. .................................. 346/140 R; 346/75

[58] Field of Search .................. 346/140 PD, 140 ID, 346/75

[56] References Cited

U.S. PATENT DOCUMENTS

| | | | |
|---|---|---|---|
| 4,216,477 | 8/1980 | Matsuda | 346/140 PD |
| 4,271,416 | 6/1981 | Shimizu | 346/140 PD |
| 4,281,333 | 7/1981 | Tsuzuki | 346/140 PD |
| 4,312,008 | 1/1982 | Taub | 346/140 PD |
| 4,330,787 | 5/1982 | Sato | 346/140 PD |
| 4,333,086 | 6/1982 | Ebi | 346/140 PD |
| 4,334,234 | 6/1982 | Shirato | 346/140 PD |

*Primary Examiner*—E. A. Goldberg
*Assistant Examiner*—M. Reinhart
*Attorney, Agent, or Firm*—David G. Alexander

[57] ABSTRACT

An on-demand type ink jet printing apparatus which prints out data in various forms such as characters and numerals by the combination of dots formed by ink droplets on a sheet of paper. An ink ejection head of the printer includes control electrodes disposed in at least one ink passageway. Ink droplets are formed and caused to fly by electric fields developed in the vicinity of the control electrodes when voltages are applied thereacross. Multiport ink ejection is achieved by the provision of a plurality of ink passageways in the head. The voltage supply to the control electrodes is controllable so that ink droplets may be formed and caused into flight in response to print signals.

A channel defining each ink passageway can be shaped easily yet with accuracy utilizing an etching characteristic particular to a specific crystal face.

A plurality of acceleration electrodes may be employed to promote desirable flight of ink droplets. Further, a counter electrode may be located in the head to face the control electrodes so that the ink droplets will be formed and fly in a further efficient and stable manner.

18 Claims, 17 Drawing Figures

Fig. 1
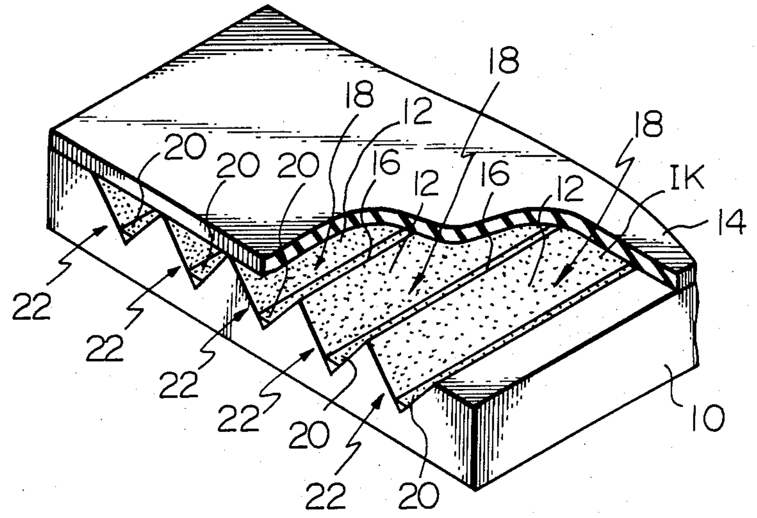
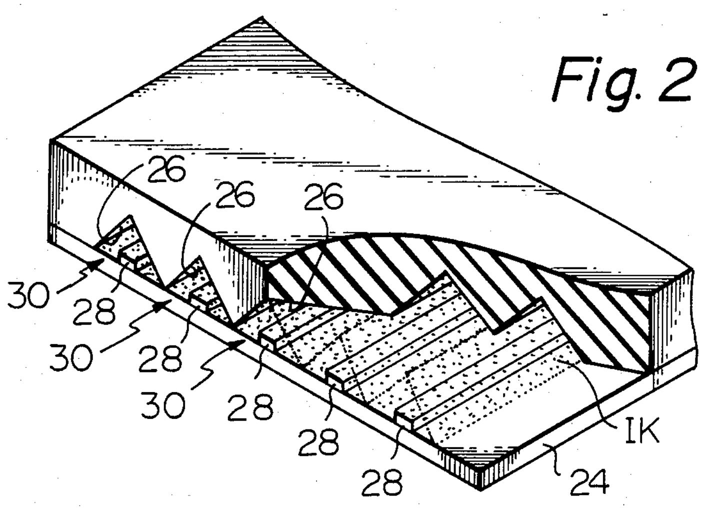
Fig. 2

INK JET PRINTING APPARATUS

BACKGROUND OF THE INVENTION

The present invention relates to ink jet printing apparatuses for use with computer systems or the like and, more particularly, to an on-demand type ink jet printer in which ink droplets are formed and caused to fly in response to electric signals to reproduce on a sheet of paper characters, numerals, symbols and other data as combinations or patterns of resulting dots.

Various ink jet printing systems have heretofore been proposed and put to practical use by virtue of their merit that information can be directly reproduced on ordinary sheets of paper without any impact. In the on-demand type system, an ink droplet in formed by an electric signal and caused to fly to impinge on a paper sheet so that the resulting dot prints out desired information in combination with other dots. Such a system renders an ink jet printer compact design because it does not require deflection of flying ink droplets and, accordingly, a deflection device. The electric signal for forming ink droplets can be suitably modulated to vary the amount of ink of an ink droplet and, thereby, the size of the dot, enabling the tone of reproduced images to be controlled within a certain range.

The on-demand ink jet printer is required to be capable of multi-port ink ejection with a plurality of ink ejection heads which correspond to a desired number of dots. Another requirement is that an electric field for shaping ink droplets be provided with a sufficient intensity in order to accomplish efficient formation and stable atomization of ink droplets.

To satisfy these requirements, an ink jet printer may be provided with an ink ejection nozzle and develop an electric field at a leading end portion of the nozzle, as disclosed in Japanese Utility Model Publication No. 54-19874/1979. Though this kind of ink jet printer is successful in achieving a sufficient intensity of electric field for the effective formation of ink droplets, it is difficult to provide the ink ejection head with a multi-port design. Alternatively, an ink jet printer may employ a plurality of control electrodes disposed in a single slot for ink ejection, as described in Japanese Patent Laid-Open Publication No. 56-170/1981 or 56-42664/1981. While such an alternative design promotes a multi-port ejection head construction due to the fact that ink droplets are formed by each of the control electrodes, it still fails to attain a sufficient intensity of electric field required for forming ink droplets. Additionally, it makes the atomization of ink into droplets unstable depending on the configuration of the slot.

SUMMARY OF THE INVENTION

An ink jet printing apparatus embodying the present invention employs an electric field to form an ink droplet and cause the ink droplet to fly to print out data on a sheet of paper. An ink ejection head of the ink jet printer is formed with an ink passageway defined by a plurality of inner walls which are at least partly shaped by an insulating material. A control electrode is formed on the inner wall part of the ink passageway which is shaped by the insulating material. An ink ejection port is defined at an end portion of the head where the control electrode is exposed to the outside from the ink passageway. A control unit forms an ink droplet by applying a voltage across the control electrode of the ink ejection head in response to printing data supplied thereto.

In accordance with the present invention, an on-demand type ink jet printing apparatus prints out data in various forms such as characters and numerals by the combinations of dots formed by ink droplets on a sheet of paper. An ink ejection head of the printer includes control electrodes disposed in at least one ink passageway. Ink droplets are formed and caused to fly by electric fields developed in the vicinity the control electrodes when voltages are applied thereacross. Multiport ink ejection is achieved by the provision of a plurality of ink passageways in the head. The voltage supply to the ciontrol electrodes is controllable so that ink droplets may be formed and caused into flight in response to print signals.

A channel defining each ink passageway can be shaped easily yet to accuracy utilizing an etching characteristic particular to a specific crystal face.

A plurality of acceleration electrodes may be employed to promote desirable flight of ink droplets. Further, a counter electrode may be located in the head to face the control electrodes so that the ink droplets will be formed and fly in a further efficient and stable manner.

It is an object of the present invention to provide an ink jet printing apparatus which meets both the demands for a multi-head ink ejection design and an intensity of electric field great enough for the formation of ink droplets.

It is another object of the present invention to provide an ink jet printing apparatus which stably atomizes an ink into droplets.

It is another object of the present invention to provide an ink ejection head for an ink jet printer which forms ink droplets in a desirable manner despite its simple construction.

It is another object of the present invention to provide an ink ejection head for an ink jet printer which can be formed with ink ejection ports to a significant accuracy.

It is another object of the present invention to provide a generally improved ink jet printing apparatus.

Other objects, together with the foregoing, are attained in the embodiments described in the following description and illustrated in the accompanying drawing.

BRIEF DESCRIPTION OF THE DRAWING

FIG. 1 is a partly taken away fragmentary perspective view of an ink ejection head included in an ink jet printer embodying the present invention;

FIGS. 2–6 are views similar to FIG. 1 but showing other embodiments of the present invention;

DESCRIPTION OF THE PREFERRED EMBODIMENTS

Figure 3:
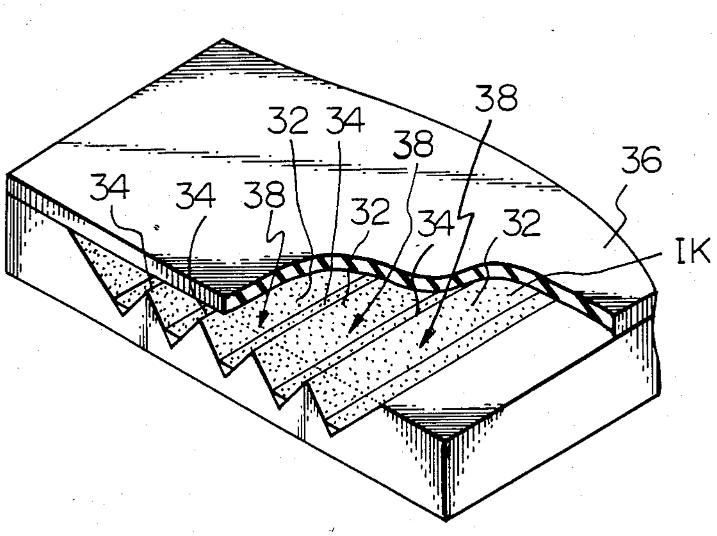

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Referring to FIG. 1 of the drawing, an ink ejection head applicable to the ink jet printer of the present invention includes a base 10 formed of an electrically insulating material. The base 10 is formed with a plurality of parallel generally V-shaped channels 12. A plate member 14 also made of an insulating material is laid on the base 10 to cover the V-shaped channels 12, thereby defining parallel V-shaped ink passageways 18. The ridges 16 between adjacent channels 12 are held in contact with the underside of the plate member 14, so that the communication of ink IK between the adjacent passageways 18 is blocked up.

A control electrode 20 is positioned at and along the bottom of each channel 12 or passageway 18. When a predetermined voltage is applied across the control electrode 20, an electric field is developed around the electrode to atomize the ink IK within the passageway 18. The atomized ink is ejected as a droplet from an ink ejection port 22 which is defined by an end of the passageway 18 and where the control electrode 20 is exposed to the outside. The ink passageways 18 are individually communicated with an ink reservoir (not shown) through suitable pumping means, as will also be the case with other various embodiments to follow.

Referring to FIG. 2, another form of the ink ejection head is illustrated in which the configuration shown in FIG. 1 is generally positioned upside down. The ejection head in FIG. 2 has control electrodes 28 which are carried on a plate member 24 to face corresponding V-shaped channels 26. As in FIG. 1, an ink ejection port 30 is defined by an end of each V-shaped channel 26 where the associated control electrode 28 is exposed to the outside.

Another form of the ink ejection head is shown in FIG. 3 which is essentially similar to the head of FIG. 1 except that the ridges 34 between adjacent V-shaped channels 32 remain clear of the underside of a plate member 36. Thus, in FIG. 3, ink IK in one ink passageway 38 is communicated with that in the neighboring passageways 38 over the ridges 34. The rest of the configuration is common to the ink ejection head shown in FIG. 1.

While the ink passageways in all the embodiments shown in FIGS. 1–3 are shaped such that their cross-sections perpendicular to the direction of ink flow are triangular, they may be shaped to present rectangular cross-sections as will be described with reference to FIGS. 4–6.

Figure 4:
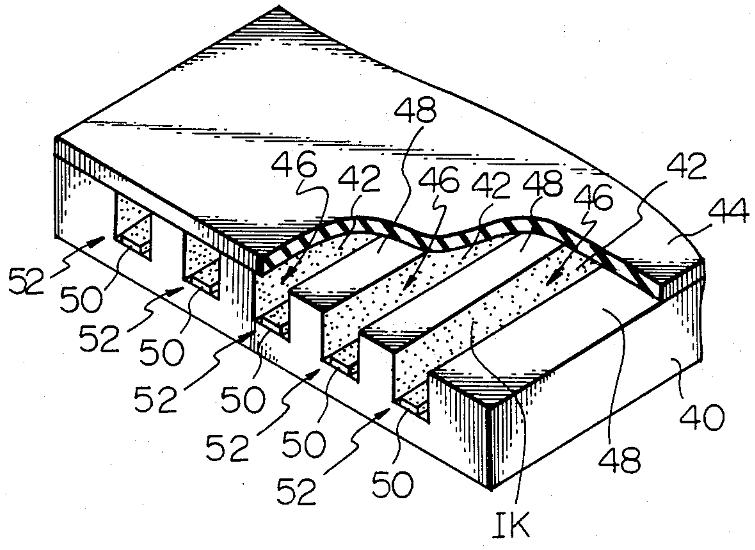

Referring to FIG. 4, a base 40 made of an insulating material is provided with a plurality of parallel rectangular channels 42. A plate member 44 also made of an insulating material is laid on the top of the base 40 to cover the channels 42, thereby defining parallel ink passageways 46. The upright walls between the adjacent channels 42 are individually engaged with the plate 44 at their tops 48, so that the communication between the ink passageways 46 is intercepted. A control electrode 50 extends on and along the bottom of each channel 42 or ink passageway 46. An ink ejection port 52 is defined by an end of each ink passageway 46 where the associated control electrode 50 is exposed to the outside.

Figure 5:
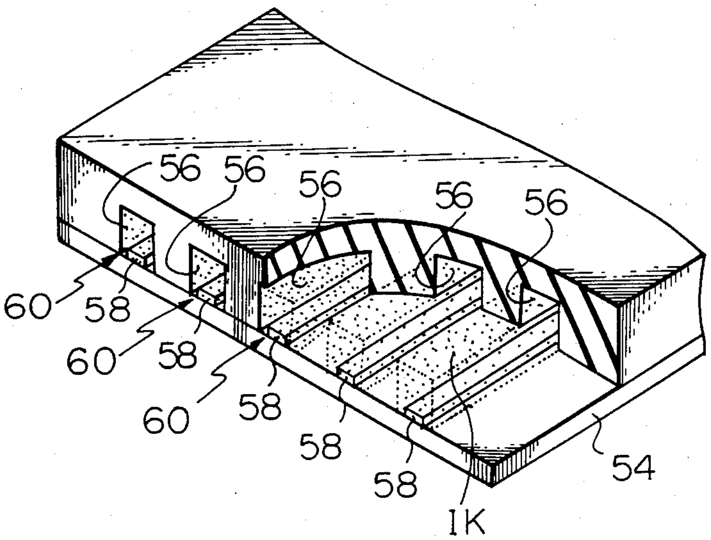

Referring to FIG. 5, the ink ejection head is a generally inverted version of the configuration shown in FIG. 4. Control electrodes 58 are laid on a plate member 54 to face the bottoms of their associated rectangular channels 56. As in FIG. 4, an ink ejection port 60 is defined by an end of each channel 56 where the corresponding control electrode 58 is exposed to the outside.

Figure 6:
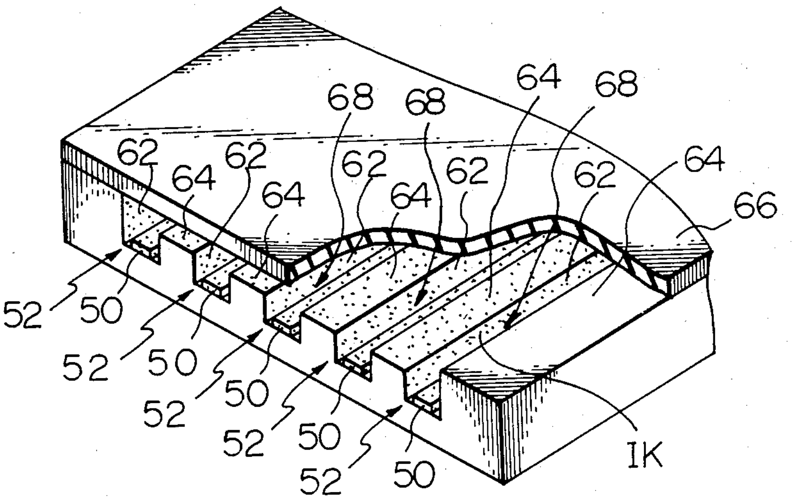

Referring to FIG. 6, the ink ejection head is essentially similar to the head of FIG. 4. The difference is that in FIG. 6 the tops 64 of the walls intervening between adjacent channels 62 are kept clear of the underside of a plate member 66. This allows ink IK in one passageway 68 to be communicated to the adjacent passageways 68 over the ridges 64. The rest of the structure is similar to that illustrated in FIG. 4.

As previously mentioned, the base 10 shown in FIG. 1 is made of an insulating material and is shaped with parallel channels 12. Use is preferably made of photosensitive glass for the base 10 in order to promote convenient and easy shaping of the channels 12. Photosensitive glass can be photoetched and, thus, facilitates efficient and accurate shaping of multiple channels 12. The same applies to the various forms of ink ejection heads shown in FIGS. 2–6.

Other insulating materials which can be efficiently treated include silicon and germanium. Silicon or germanium is particularly desirable because the channels 12 can be readily formed due to their unique property that the etching rate of their single crystal differs from one crystal face to another for a suitable etching solution. Reference will be made to FIGS. 7 to 9a–9f for describing one example of such etching processes. In the following description, the crystallographic axes and crystal faces of a single crystal will be indicated by usual notation. It should be remembered that the hatching in FIGS. 9a–9f is only for the illustrative purpose and does not indicate sections.

Figure 7:
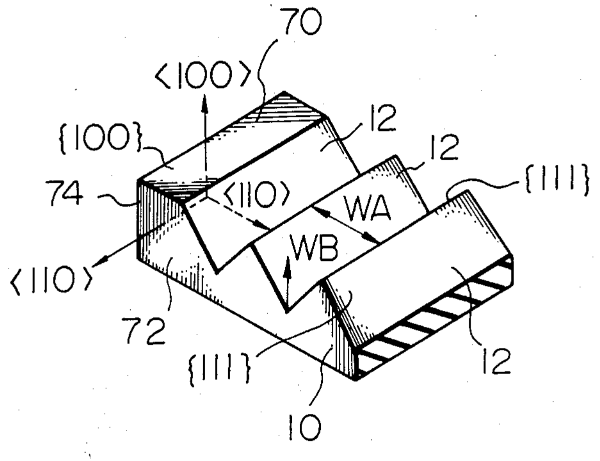
FIG. 7 is a perspective view indicating a relationship between an ink ejection head and crystallographic axes of a single crystal which constitutes the head.
Figure 9A:
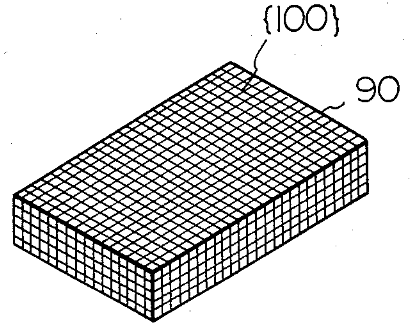
FIGS. 9*a*–9*f* are perspective views demonstrating an exemplary process for forming ink passageways in an ink ejection head.

Referring to FIG. 7, there is shown a base 10 made of a single crystal of silicon. The base 10 has a flat surface 70 to engaged with the plate 14 which is normal to the crystal axis $<100>$ and, therefore, constitutes a crystal face $\{100\}$. The base 10 has another surface 72 to define ink ejection ports which is normal to the crystal axis $<110>$. A single crystal wafer 90 having such crystallographic axes is shown in FIG. 9a. Etching the wafer 90 by the process indicated in FIGS. 9b–9f forms the channels 12 therein such that the walls defining each channel 12 constitute crystal faces $<111>$.

Figure 9B:
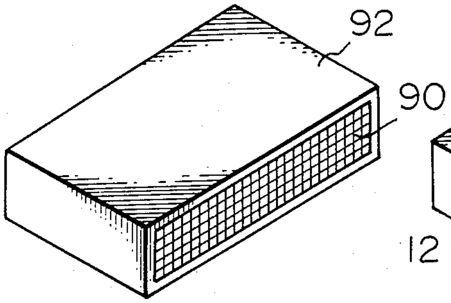
Figure 9C:
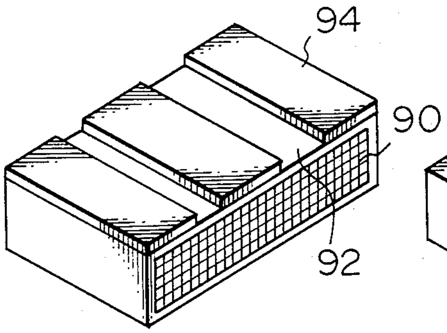
Figure 9D:
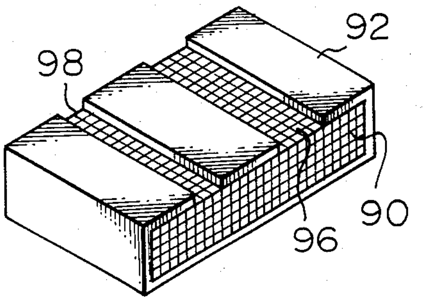
Figure 9E:
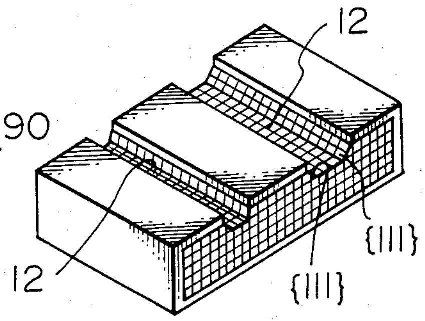
Figure 9F:
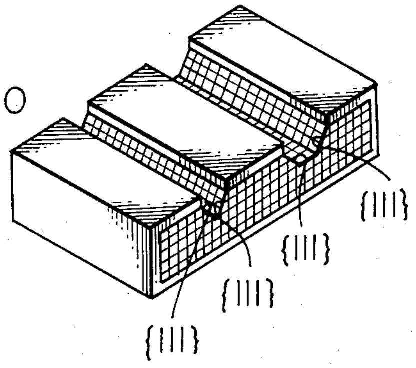

In detail, an oxide layer or film 92 is grown on the silicon single crystal wafer 90 to the configuration shown in FIG. 9b, as by placing the wafer 90 in a steam atmosphere of a temperature within the range of about 800°–1200° C. A required thickness of the oxide film 92 is not more than about 0.3% of the etching depth in the wafer 90. A photoresist is applied to the oxide film 92 and then exposed to light through a mask. The photoresist is partly removed by the subsequent development to leave a resist pattern 94 as shown in FIG. 9c. That part of the oxide film 92 exposed through the resist pattern 94 is removed by an aqueous solution of hydrofluoric acid, followed by the removal of the resist pattern 94 to produce the configuration shown in FIG. 9*d*. Etching is carried out on the wafer 90 in the condition of FIG. 9*d* by use of, for example, a solution of patassium hydroxide of a concentration of 5–40% and a temperature of 80° C. The etching rate of the crystal faces {111} has been found inherently as low as about 0.3–0.4% of the etching rate of the crystal face {100} when processed by the solution of an alkaline substances such as sodium hydroxide, potassium hydroxide or hydrazine. Etching the crystal face {111}, by virtue of such a property thereof, makes the crystal face {111} angled $\tan^{-1}\sqrt{2}$ (about 54°) relative to the crystal face {100} and smooth and accurate. The etching is carried out on exposed portions 96 and 98 of the wafer 90 taking advantage of the nature described, as shown in FIGS. 9*e* and 9*f*. The walls defining the channels 12 coincide with the crystal face {111}. That is, etching proceeds on the exposed portions 96 and 98 of the wafer 90 because they are the crystal face {100}, but in due course the etching becomes limited by the crystal faces {111} to define the generally V-shaped channels 12.

The accuracy of the channels 12 so formed is excellent. The undercut at end portions of the oxide film 92, that is, the degree of erosion of the single crystal wafer is as small as about 0.2% of the etching depth in the crystal surface {100}. Accordingly, the open tops of the channels 12 shown in FIG. 7 can be dimensioned quite accurately to the width WA within a tolerance range of about ±5 μm. Furthermore, because the crystal faces {111} are angled $\tan^{-1}\sqrt{2}$ relative to the crystal face {100}, the width WB of each channel 12 shown in FIG. 7 is expressed as $WA/\sqrt{2}$ and, therefore, dependent on the width WA.

Figure 8:
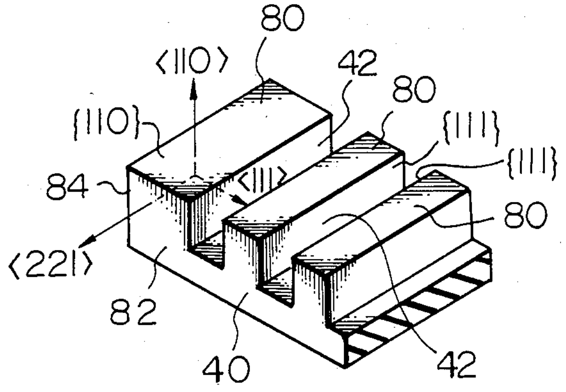
FIG. 8 is a perspective view also showing a relation between an ink ejection head and crystallographic axes of a single crystal which constitutes the head.

In case where the base shown in any one of FIGS. 4–6 is manufactured utilizing the above-described property of the crystal faces {111}, the crystallographic axes will be directed as shown in FIG. 8. In the drawing, the base 40 has flat surfaces 80 to engage with the plate 44 which are normal to the axis <110> and, accordingly, constitute crystal faces {110}. The surface 82 of the base 40 to define ink ejection ports is normal to the axis <221>. The surface 84 normal to both the surfaces 80 and 82 is normal to the axis <111>, constituting a crystal face {111}. The single crystal silicon wafer having such crystallographic axes and crystal faces is subjected to the etching treatment described with reference to FIGS. 9*b*–9*f*, thus being formed with the channels 42. Each channel 42 is defined by opposite side walls or crystal faces {111} and, accordingly, to significant degrees of smoothness and accuracy. It will be apparent that germanium, for example, is comparable with silicon in shaping the base with desirable channels.

While the base needs to set up sufficient insulation between adjacent control electrodes as indicated in FIGS. 1–6, the material employed for the base may sometimes be relatively poor in insulation. When a single crystal silicon wafer is used for the base, for example, the insulation should be enhanced by growing an oxide film on each wall which defines a channel as shown in FIG. 9*b*.

Figure 10:
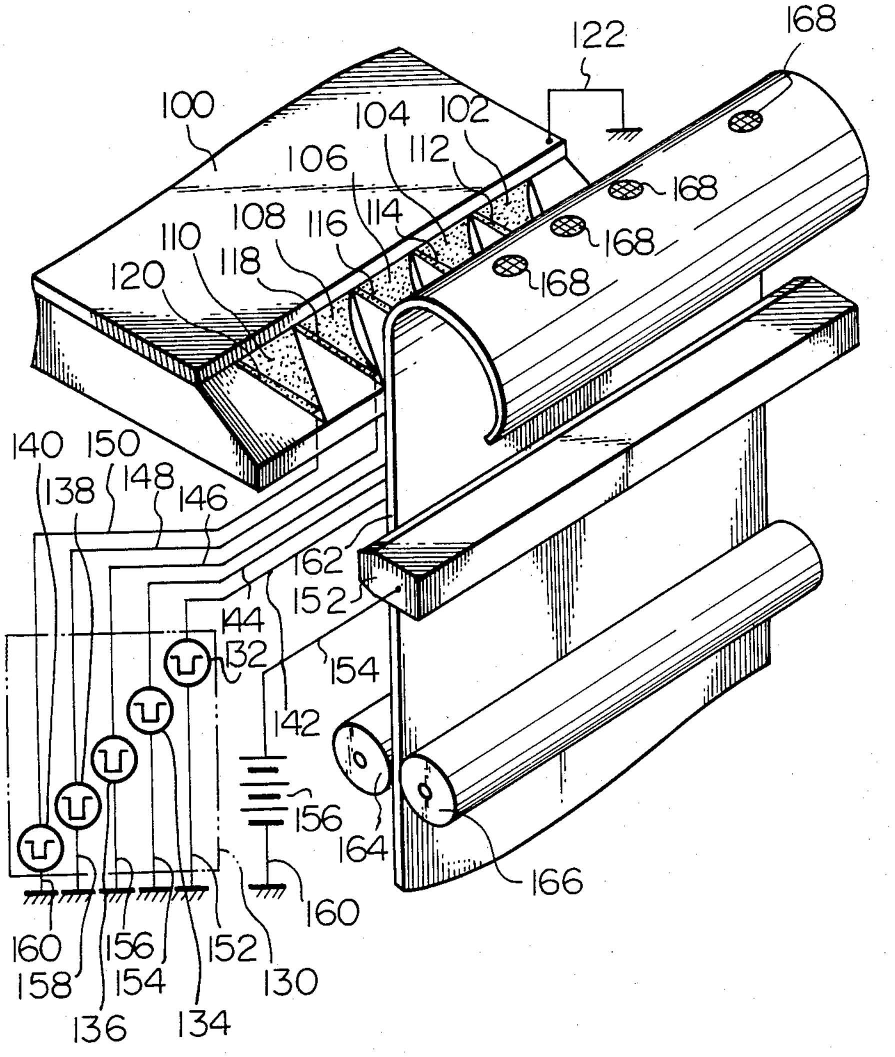
FIG. 10 is a fragmentary perspective view of an ink jet printer in accordance with the present invention which is provided with the ink ejection head shown in FIG. 1.

Referring to FIG. 10, an ink jet printing apparatus is shown in a fragmentary view which is equipped with the ink ejection head described with reference to FIG. 1. The ink ejection head, designated by the reference numeral 100, is formed with a plurality of ink ejection ports 102, 104, 106, 108 and 110 with which control electrodes 112, 114, 116, 118 and 120 are associated, respectively. The ejection ports 102–110 are individually notched to define sharp ends so that the associated control electrodes 112–120 protrude therefrom. The control electrodes 112–120 are connected to pulse output power sources 132, 134, 136, 138 and 140 of a control unit 130 by lines 142, 144, 146, 148 and 150, respectively. The power sources 132–140 are in turn connected to ground by lines 152, 154, 156, 158 and 160, respectively. The control unit 130 is supplied with printing data from a computer or like external system and selects ink ejection ports for ejecting ink droplets. Out of the pulse output power sources 132–140, those corresponding to the selected ejection ports are driven to supply their associated control electrodes with voltage pulses. Why the head 100 is grounded through a line 122 will become apparent later.

An acceleration electrode 152 is located in face-to-face relation with the ejection ports 102–110 in the head 100. The acceleration electrode 152 is connected by a line 154 with the positive terminal of a power source 156 the negative terminal of which is connected to ground by a line 160. With this arrangement, the power source 156 sets up an electric field between the control electrodes 112–120 and the acceleration electrode 152 so that ink droplets flying across the electric field may be accelerated. Here, the voltage at the power supply 156 is regulated to a level low enough to be incapable of causing ink droplets from being ejected from the ink ejection ports 102–110. A sheet of paper 162 is positioned adjacent to the front end of the acceleration electrode 152 which faces the ink ejection ports 102–110. The paper sheet 162 is fed in a predetermined direction by a usual sheet feed mechanism which may include feed rollers 164 and 166 as illustrated.

In operation, the sheet is fed a predetermined amount at first by the sheet feed mechanism. Then, the pulse output power sources 132–140 are selectively driven to deliver pulses which are opposite in polarity to the voltage applied from the power supply 156 across the acceleration electrode 152, i.e. negative voltages with respect to the ground level. This increases the gradient of the electric field developed between the control electrodes 112–120 associated with the pulse output power sources and the acceleration electrode 152, whereby the intensity of electric field at the exposed end of each energized control electrode becomes increased. As a result, ink droplets are formed at and ejected from the ejection ports 102–110 associated with the energized control electrodes, impinging on the paper sheet 162 while being accelerated by the acceleration electrode 152. For example, when the control electrodes 112, 116, 118 and 120 are supplied by the pulse output power sources 132, 136, 138, 140, respectively, a string of dots 168 will be formed on the paper sheet 162. Such dots may be suitably combined to reproduce a desired pattern as typified by a character or a numeral.

The supply of voltage pulses from the pulse output power sources 132–140 to the control electrodes 112–120 is properly timed to the feed of the paper sheet 162 by a mechanism or a control sommon to conventional printers. The voltage pulses may be applied desired ones of the control electrodes 112–120 either all at a time or in sequence. This also holds true in an ink jet printer which will be described hereunder with reference to FIG. 11.

Figure 11:
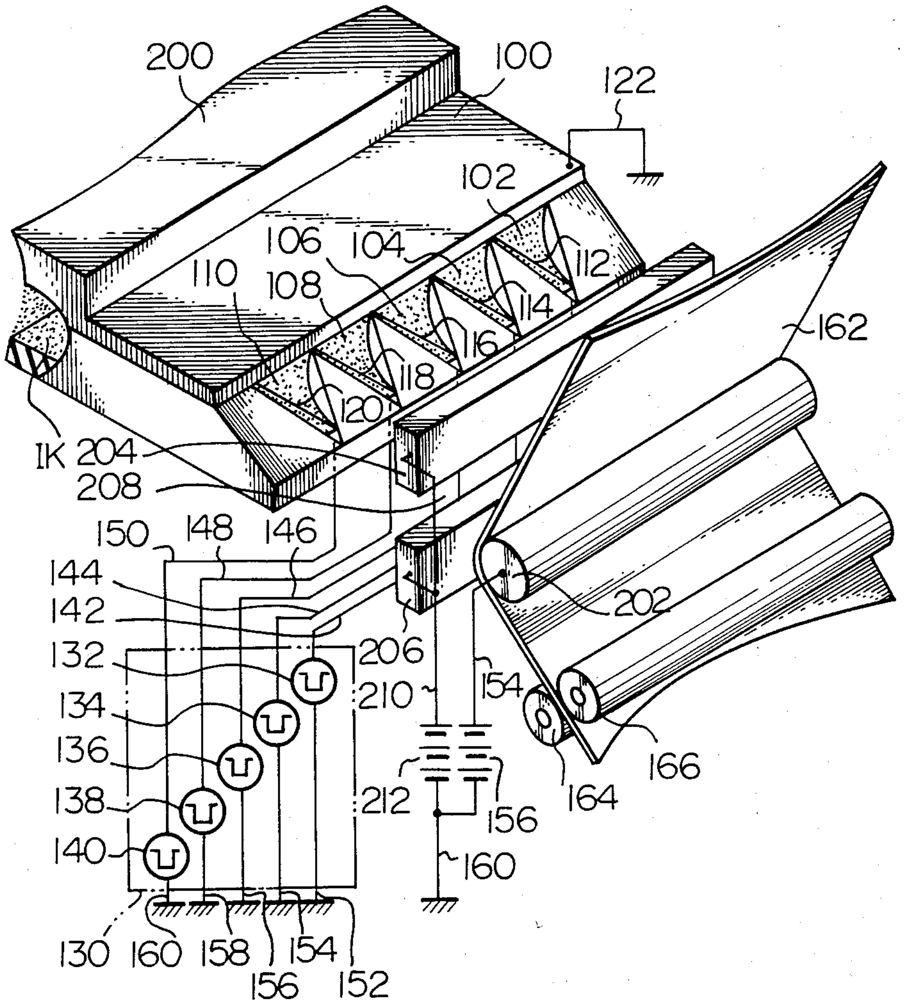
FIG. 11 is a view similar to FIG. 10 but showing another form of the ink jet printer in accordance with the present invention.

Referring to FIG. 11, another embodiment of the ink jet printer is shown which is similar to the embodiment of FIG. 10 as far as the use of the head indicated in FIG. 1 is concerned. A characteristic feature of the FIG. 11 construction is that the distance between the head 100 and the paper sheet 162 can be made longer than that in the FIG. 10 construction. In FIG. 11, the structural elements common to those shown in FIG. 10 will be designated by the same reference numerals and description thereof will be omitted for simplicity.

In FIG. 11, an ink reservoir 200 is connected with the ink ejection head 100 so as to supply ink IK thereto. Connected with the power supply 156 is an acceleration electrode 202 which is formed cylindrical in this embodiment. A second and third acceleration electrodes 204 and 206 are disposed one above the other between the ejection ports 102–110 in the head 100 and the paper sheet 162. The acceleration electrodes 204 and 206 are spaced a predetermined distance to define a clearance 208 through which ink droplets can fly toward the paper sheet 162. The acceleration electrodes 204 and 206 are connected by a line 210 with the positive terminal of a second power supply 212 the negative terminal of which is connected to ground by a line 160. When energized by the power supply 212, the acceleration electrodes 204 and 206 form an electric field between them and the control electrodes 112–120 in order to accelerate ink droplets. It will thus be seen that the acceleration applied to ink droplets not only by the electrode 202 but by the electrodes 204 and 206 permits a sufficient distance to be employed between the ink ejection head 100 and the paper sheet 162.

In the embodiments described above in conjunction with FIGS. 10 and 11, the plate 14 of the ink ejection head 100 is made of an insulator as previously discussed with reference to FIG. 1. The plate 14, however, may be formed of a conductor such as metal and supplied with a predetermined voltage for the purpose of promoting further effective formation and flight of ink droplets.

In FIG. 10 or 11, supposing that a force F is imparted to the ink IK at the exposed leading end portion of the control electrode 112, the force F may be expressed as:

$$F=\alpha\cdot\text{grad }(E)^2+qE \qquad \text{Eq. (1)}$$

where $\alpha$ is a constant based on the polarizability of the ink IK, q an amount of charge induced in the ink by an external electric field, and E the intensity of the external electric field. Further, grad $(E)^2$ is identical in meaning with $\nabla(E)^2$ in which $\nabla$ is a vector operator expressed as:

$$\nabla=2/2xi+2/2yj+2/2zk \qquad \text{Eq. (2)}$$

where i, j and k are unit vectors which are normal to each other in the Cartesian coordinates. In Eq. (1), the first term indicates a force resulting from polarization and which forms an ink droplet, while the second term indicates a Coulomb's force resulting from an external electric field and which causes the flight or acceleration of the ink droplet. The same holds true for the other control electrodes 114, 116, 118 and 120.

Meanwhile, the plate 14 may be formed of a conductor to serve as a counter electrode which faces the control electrodes 112–120. An arrangement may be made such that the counter electrode is supplied with a voltage opposite in polarity to the voltage applied across the acceleration electrodes 152, 202, 204 and 206 or with the ground potential. Then, the forces expressed by the first and second terms of Eq. (1) will be intensified to accomplish far more effective formation and flight of ink droplets. The voltage applied across the counter electrode and control electrodes, which may be either one of a.c. and d.c., may be modulated in pulse duration or amplitude to vary the size or diameter of ink droplets as desired. This effect will become more prominent when use is made of the construction shown in FIG. 3 or 6. For the same purpose, the acceleration electrodes 204 and 206 shown in FIG. 11 may be located closer to the exposed ends of the control electrodes 112–120. The connection of the plate to ground through line 122 in FIGS. 10 and 11 is directed to the same effect.

Figure 12:
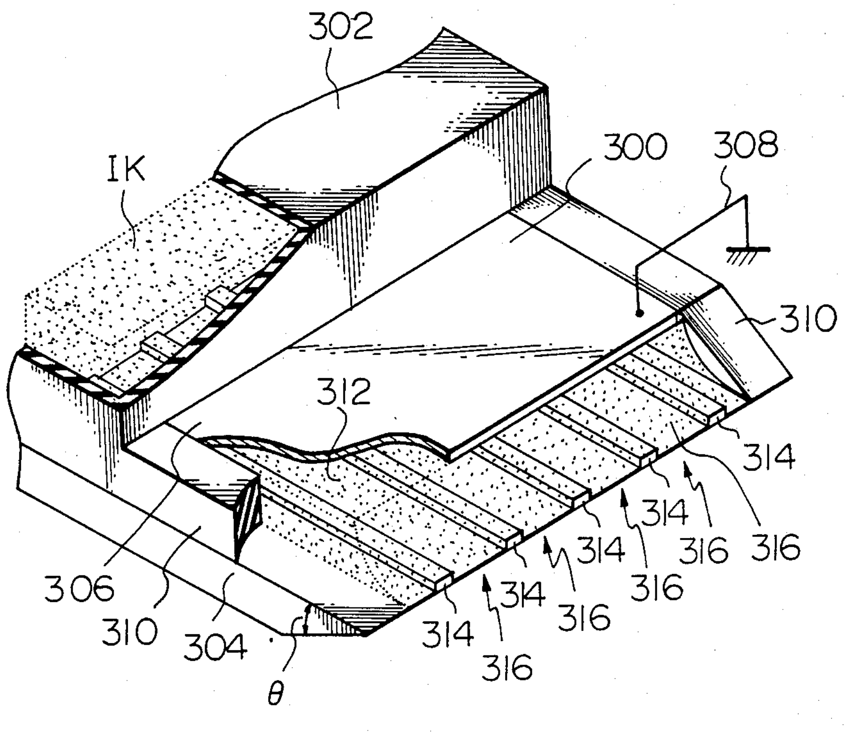
FIG. 12 is a partly taken away fragmentary perspective view of still another embodiment of the present invention.

Referring to FIG. 12, an alternative construction of the ink ejection head is illustrated and generally designated by the reference numeral 300. An ink reservoir 302 is connected with the ink ejection head 300 to supply ink IK thereto. As shown, the leading end portion of a base 304 is shaped with an acute angle $\theta$ to the general horizontal plane of the head 300. This effectively prevents the leading end portion of the base 304 from becoming wet with ink IK and, therefore, allows ink droplets to be formed in a stable manner. The base is made of an insulating material such as a printed circuit board. A plate 306 cooperating with the base 304 is made of a conductor and connected to ground by a line 308. Spacers 310 are mounted on opposite ends of the base 304 to define a predetermined distance between the base 304 and the plate 306. Thus, the base 304 and plate 306 defines a space therebetween which serves as an ink passageway 312. A plurality of control electrodes 314 are mounted at suitably spaced locations on the base 304 within the ink passageway 312. Ink ejection ports 316 are defined at the end of the head 300 where the control electrodes 314 are exposed to the outside. The ejection ports 316 are sharply angled to desirably separate the ink into droplets by centralizing the electric fields the control electrodes 314. The control electrodes 314 project individually toward the plate 306 which functions as a counter electrode. It will be understood that the ink ejection head shown in FIG. 12 features a simpler construction than any one of the ink ejection heads shown in FIGS. 1–6.

In all the embodiments described hereinabove, use of a conductive ink should be avoided in order to centralize the electric fields on the control electrodes or to prevent short-circuiting among the control electrodes. For the multi-port ink ejection, it is particularly desirable to use an ink having a high electrical resistance. A preferred resistance of the ink is $10^6$ Ωcm or more, though depending on the printing rate.

In summary, it will be seen that the present invention provides an ink jet printing apparatus which facilitates multi-port ink ejection and promotes efficient and stable formation or flight of ink droplets.

Various modifications will become possible for those skilled in the art after receiving the teachings of the present disclosure without departing from the scope thereof. For example, the number of ink ejection ports is not limited to five as in the embodiments, but may be varied to match with a desired number of printing dots. The cross-sectional shape of each ink passageway or that of ink ejection port may be a circle or a trapezoid, instead of the triangle or the rectangle shown and described. If desired, a plurality of ink ejection heads may be stacked one upon another.

Furthermore, ceramics or like material may be used for the base so as to form the channels during baking or by a mechanical technique.

What is claimed is:

1. An ink jet printing apparatus, comprising:
- an ink ejection head having means defining first and second parallel inner walls which face each other, the first inner wall being formed with a plurality of parallel ridges made of an electrically insulative material which extend at least partially toward the second inner wall to define respective ink ejection passageways between adjacent ridges;
- a plurality of control electrodes disposed in the respective ink ejection passageways on the first inner wall;
- a counter electrode disposed on the second inner wall facing the control electrodes;
- means for supplying ink into the ink ejection passageways; and
- means for selectively applying an electric voltage between the counter electrode and the individual control electrodes causing ink to be ejected from the respective ink ejection passageways for printing.

2. An ink jet printing apparatus as claimed in claim 1, in which the insulative material is made of photosensitive glass.

3. An ink jet printing apparatus as claimed in claim 1, in which the means defining the first inner wall and the ridges are integral and made of a single crystal material.

4. An ink jet printing apparatus as claimed in claim 3, in which the ink passageways are defined by at least two inner surfaces constituted by crystal faces (111) of single crystal silicon.

5. An ink jet printing apparatus as claimed in claim 3, in which the ink passageways are defined by at least two inner surfaces constituted by crystal faces (111) of single crystal germanium.

6. An ink jet printing apparatus as claimed in claim 1, in which a plurality of control electrodes are disposed in the ink passageway.

7. An ink jet printing apparatus as claimed in claim 6, in which the control unit supplies a voltage to each of the control electrodes independently of the others.

8. An ink jet printing apparatus as claimed in claim 1, in which the ink ejection head is provided with a counter electrode carried on that inner surface of the ink passageway which faces the control electrode, said counter electrode being held at a potential which intensifies an electric field adjacent to the control electrode.

9. An ink jet printing apparatus as claimed in claim 8, in which the counter electrode is shaped by a plurality of control electrodes.

10. An ink jet printing apparatus as claimed in claim 1, further comprising an acceleration electrode and means for applying an electric voltage to the acceleration electrode for accelerating ink droplets ejected from the ink ejection passageways.

11. An ink jet printing apparatus as claimed in claim 10, in which the acceleration electrode is positioned to the rear of a sheet of paper while facing the ink ejection head.

12. An ink jet printing apparatus as claimed in claim 10, in which the acceleration electrode comprises a first electrode member located to the rear of a sheet of paper to face the ink ejection head and a second electrode member located between the ink ejection head and the paper sheet, said second electrode member being formed with an opening through which the ink droplets are ejected from the ink ejection head.

13. An ink ejection head for an ink jet printing apparatus, comprising:
- means defining first and second parallel inner walls which face each other, the first inner wall being formed with a plurality of parallel ridges made of an electrically insulative material which extend at least partially toward the second inner wall to define respective ink ejection passageways between adjacent ridges; and
- a plurality of control electrodes disposed in the respective ink ejection passageways on the first inner wall;
- an ink ejection end of the ink ejection head being formed in the shape of an acute angle so that the control electrodes protrude further in an ink ejection direction than the second inner wall.

14. An ink jet printing apparatus as claimed in claim 13, in which the insulative material is made of photosensitive glass.

15. An ink jet printing apparatus as claimed in claim 13, in which the means defining the first inner wall and the ridges are integral and made of a single crystal material.

16. An ink jet printing apparatus as claimed in claim 15, in which the ink passageways are defined by at least two inner surfaces constituted by crystal faces (111) of single crystal silicon.

17. An ink jet printing apparatus as claimed in claim 15, in which the ink passageways are defined by at least two inner surfaces constituted by crystal faces (111) of single crystal germanium.

18. An ink jet printing apparatus as claimed in claim 13, further comprising a counter electrode disposed on the second inner wall facing the control electrodes.

* * * * *